United States Patent [19]

Attanasio et al.

[11] Patent Number: 5,668,943

[45] Date of Patent: Sep. 16, 1997

[54] VIRTUAL SHARED DISKS WITH APPLICATION TRANSPARENT RECOVERY

[75] Inventors: Clement Richard Attanasio, Peekskill; Maria Angela Butrico, Blauvelt, both of N.Y.; James Lyle Peterson, Austin, Tex.; Christos Alkiviadis Polyzois, White Plains; Stephen Edwin Smith, Mahopac, both of N.Y.

[73] Assignee: International Business Machines Corporation, Armonk, N.Y.

[21] Appl. No.: 653,098

[22] Filed: May 24, 1996

Related U.S. Application Data

[63] Continuation of Ser. No. 332,157, Oct. 31, 1994, abandoned.

[51] Int. Cl.$^6$ .................................................. G06F 11/00
[52] U.S. Cl. ........................... 395/182.05; 395/182.02; 395/182.13; 395/183.19
[58] Field of Search ..................... 395/182.02, 182.03, 395/182.04, 182.05, 183.18, 183.19, 182.08, 200.08, 182.13

[56] References Cited

U.S. PATENT DOCUMENTS

| 5,155,845 | 10/1992 | Beal et al. | 395/182.05 |
|---|---|---|---|
| 5,193,086 | 3/1993 | Satomi et al. | 395/182.02 |
| 5,197,148 | 3/1993 | Blount et al. | 395/182.03 |
| 5,202,887 | 4/1993 | Ueno et al. | 395/182.03 |
| 5,212,785 | 5/1993 | Powers et al. | 395/182.03 |
| 5,218,601 | 6/1993 | Chujo et al. | 395/182.02 |
| 5,226,037 | 7/1993 | Satomi et al. | 395/182.02 |
| 5,226,151 | 7/1993 | Takida et al. | 395/182.03 |

OTHER PUBLICATIONS

A. M. Gheith and J. L. Peterson, "Shared Virtual Disk for a Cluster of Processors with Separate I/O Devices and Shared Memory", IBM Technical Disclosure Bulletin, vol. 36, No. 06B, pp. 375–377, Jun. 1993.

H. Bardsley III et al., "Dynamic Storage Susbsystem Path Switching", IBM Technical Disclosure Bulletin, vol. 32, No. 11, pp. 168–169, Apr. 1990.

J. C. O'Quin et al., "Takeover Scheme for Control of Shared Disks", IBM Technical Disclosure Bulletin, vol. 32, No. 2, pp. 378–380, Jul. 1989.

Primary Examiner—Robert W. Beausoliel, Jr.
Assistant Examiner—Joseph E. Palys
Attorney, Agent, or Firm—Richard M. Ludwin; Kevin M. Jordan

[57] ABSTRACT

A system and method for recovering from failures in the disk access path of a clustered computing system. Each node of the clustered computing system is provided with proxy software for handling physical disk access requests from applications executing on the node and for directing the disk access requests to an appropriate server to which the disk is physically attached. The proxy software on each node maintains state information for all pending requests originating from that node. In response to detection of a failure along the disk access path, the proxy software on all of the nodes directs all further requests for disk access to a secondary node physically attached to the same disk.

9 Claims, 6 Drawing Sheets

VIRTUAL SHARED DISKS WITH APPLICATION TRANSPARENT RECOVERY

This is a continuation, of application Ser. No. 08/332, 157, filed Oct. 31, 1994, now abandoned.

I. BACKGROUND OF THE INVENTION a. Field of the Invention

This invention relates generally to a distributed computing environment. More particularly, it relates to a method for use in a cluster of processors, wherein each processor in the cluster can access any disk in the cluster.

b. Related Art

The availability of powerful microprocessors has made clusters an attractive alternative to monolithic systems. Applications that can partition their computation among several nodes can take advantage of this architecture, which typically offers better price-performance than the monolithic systems. Such applications include large scientific computations, database and transaction processing systems, decision support systems, and so on.

A microprocessor cluster consists of a number of separate computing systems, coupled with an interprocessor communication mechanism, such as a network or communications switch. Each computing system has its own processor, memory, and I/O subsystem, and runs a separate instance of the operating system. For maximum benefit, however, it is desirable for an application to be able to abstract from the specific computing system, and treat all nodes in a cluster as equivalent. This ability is sometimes called a "single system image."

A useful aspect of single system image is the requirement that the same I/O device resources be available to all processors in the cluster equally. This allows processing tasks to be freely moved between processors. Furthermore, it facilitates the development of parallel applications that adopt a data sharing model for their computation.

Many different approaches can be taken to providing the same I/O resources to all processors, preferably in a highly available fashion. Data replication is the simplest, especially for read-only data, but it increases cost (resources not shared) and presents difficulties when the information changes over time.

An alternative is to have devices that can be physically attached to many processors. For example, twin-tailed (dual ported) disks are common. It is possible to build four-tailed disks, and even eight-tailed disks, but they become increasingly expensive and difficult to operate.

In both of the above cases, each processor has independent access to the resources, so no action is necessary to provide continuous access to the data in case of processor and/or adapter failure.

Distributed file systems, such as NFS, AFS and DFS, abstract away from the specific I/O device to the services it is intended for and provide those services to the processors in the cluster. This restricts the use of the device to those services, thus making it inappropriate for applications that are explicitly aware of the location of the data in the memory hierarchy. For example, a database system may rely on its own buffering and may want to arrange the data on disk in its own way, rather than rely on a file system to provide these services. In this case, direct access to the I/O device may be preferred by the application.

In terms of high availability, HA-NFS presents NFS clients with a highly available NFS server, but it relies heavily on the underlying network technology (IP address takeover) to provide critical functions that enable high availability.

II. SUMMARY OF THE INVENTION

It is an object of this invention to provide transparent recovery from node and/or adapter failure, in a system that allows processors in a cluster to share I/O devices without requiring that every I/O device be attached to every node, and allow applications running on surviving nodes to continue processing despite the failure. By transparent, it is meant that applications do not have to reissue any requests they had issued before the failure occurred.

Accordingly, the present invention provides a system and method for recovering from failures in the disk access path of a clustered computing system. Each node of the clustered computing system is provided with proxy logic for handling physical disk access requests from applications executing on the node and for directing the disk access requests to an appropriate server to which the disk is physically attached. The proxy logic on each node maintains state information for all pending requests originating from that node. In response to detection of a failure along the disk access path (e.g. in a node or disk adapter), the proxy software on all of the nodes directs all further requests for disk access to a secondary node physically attached to the same disk.

In a preferred embodiment the proxy logic is embodied as a software layer that enables processors to access I/O devices physically attached to remote processors by defining virtual devices, intercepting I/O requests to those devices, and routing the requests (and data, for writes) to the appropriate server processor, to which the real device is physically attached. The server processor performs the actual I/O operation and returns a completion message (and data, for a read) to the originating processor. Upon receipt of the completion message, the originating processor notifies, accordingly, the process that had issued the request.

With twin-tailed disks, high availability can be achieved as follows. For a particular disk, one of the processors attached to the disk is designated as the primary server. During normal operation, I/O requests for the disk that originate anywhere in the cluster are sent to the primary server. If the primary server or its disk adapter fails, one of the other processors attached to the disk becomes primary server for the disk, and the request routing information on each processor is changed, so that new requests are sent to the new primary server.

In the preferred embodiment, the server is totally stateless; the full state of pending remote requests is maintained on the client. Thus, in case of server or adapter failure, pending requests that had been issued prior to the failure can be re-issued by the client to the new server and the applications never see the failure.

III. BRIEF DESCRIPTION OF THE DRAWING

The present invention will be better understood by reference to the drawing, wherein.

IV. DETAILED DESCRIPTION OF THE PREFERRED EMBODIMENT

Figure 1:
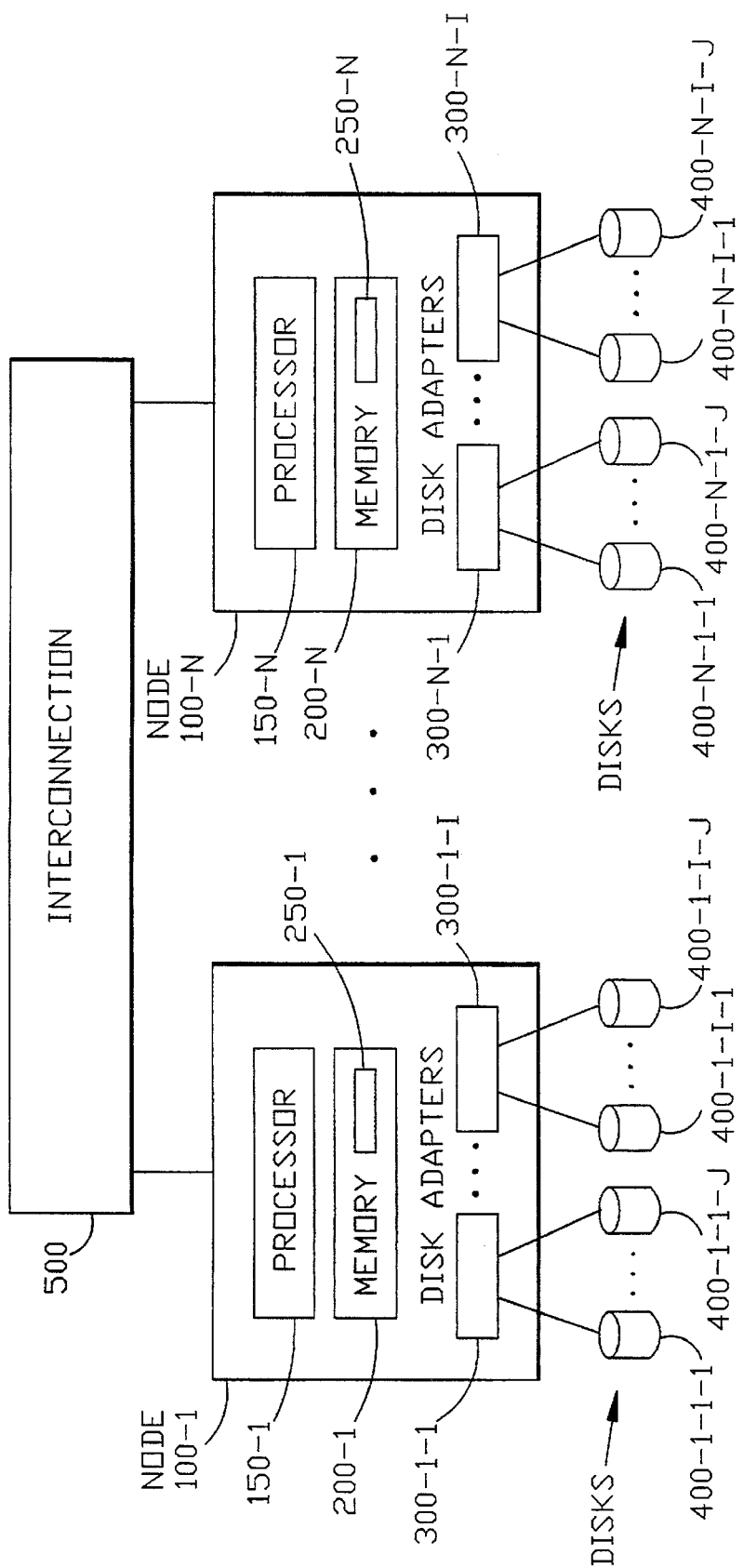
FIG. 1 is an overall block diagram of a preferred embodiment of this invention.

FIG. 1 is a block diagram of a preferred embodiment of this invention, which incorporates the subsystem of recoverable virtual shared disks. It includes a collection (cluster) of independent computing nodes (henceforth nodes) 100-1 through 100-N.

Each node has a processor labeled 150-1 for node 100-1 and memory labeled 200-1 for node 100-1 (correspondingly 150-N and 200-N for node 100-N). Those skilled in the art will readily appreciate that each node could have separate memory or nodes could share memory.

The nodes can communicate via an interconnection 500. The interconnection 500 can be a switch, a local area network, shared memory, or any other kind of medium that allows the nodes in the cluster to exchange data.

Each node has a number of disk adapters labeled 300-1-1 through 300-1-I for node 100-1 (correspondingly, 300-N-1 through 300-N-I for node 100-N). Disks labeled 400-1-1-1 through 400-1-1-J are attached to adapter 300-1-1 (correspondingly disks 400-N-I-1 through 400-N-I-J are attached to adapter 300-N-I). The number of disk adapters per node need not be the same for all nodes. Also, the number of disks per adapter need not be the same for all disk adapters. Some nodes may even have no disk adapters at all.

Disks which are shared by multiple nodes are addressed by a common name throughout the cluster, using the same programming interfaces used by a node to address a directly connected physical disk. This creates the illusion of the disks being physically connected to each node in the cluster. The software and programming interface which enables such accesses is referred to as a virtual shared disk.

Figure 7:
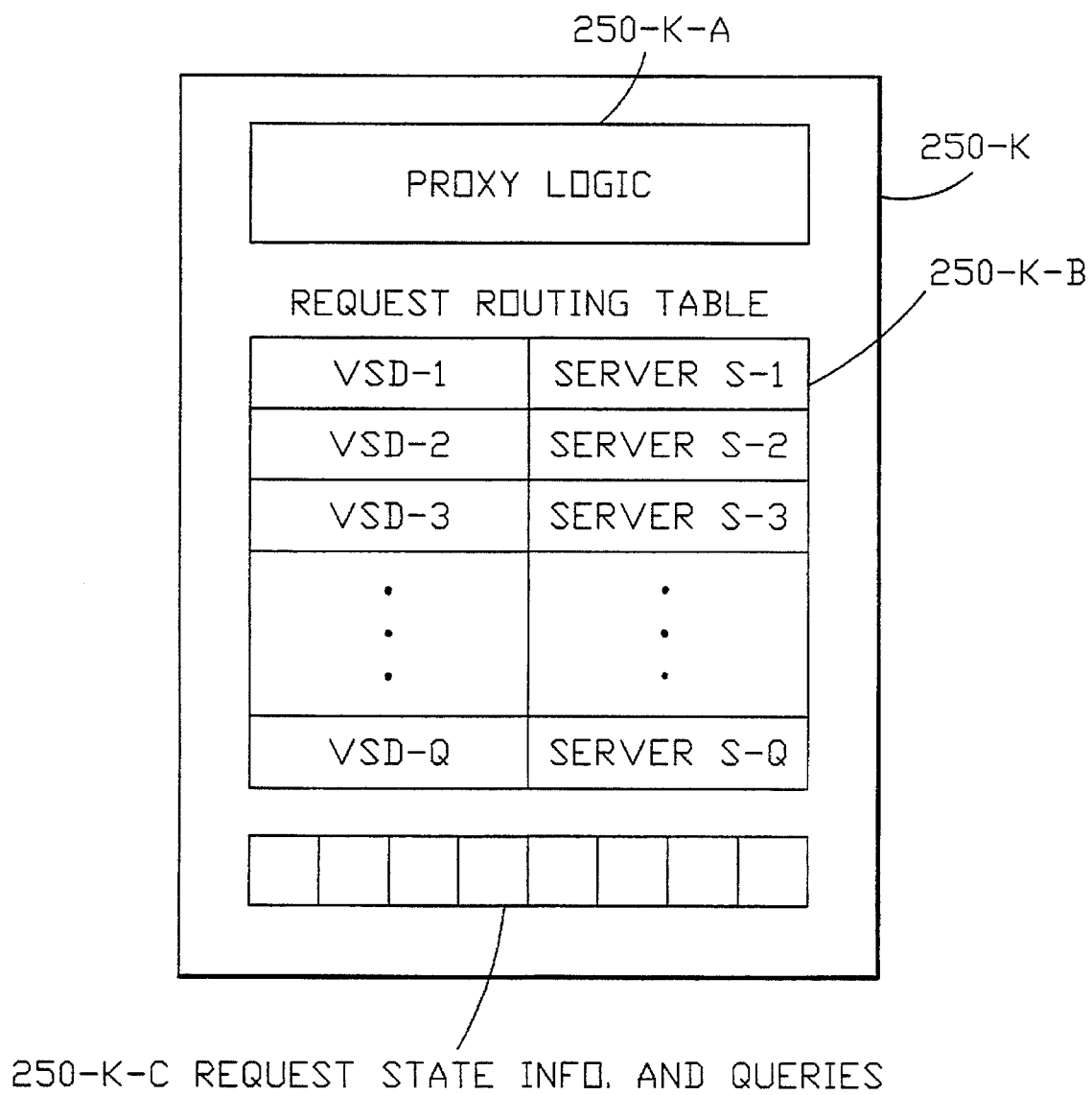

Each processor's memory contains proxy logic and state data related to the virtual shared disks. The state data includes data of a type which is conventionally maintained by operating systems for physically attached disks (e.g., device state, device name, pending request information) as well as some additional information which will be described herein. This logic and related data is shown as block 250-1 for node 100-1 (correspondingly 250-N for node 100-N). Such a block for a node 100-K is shown in detail in FIG. 7. The proxy logic is shown as block 250-K-A in FIG. 7.

Figure 2:
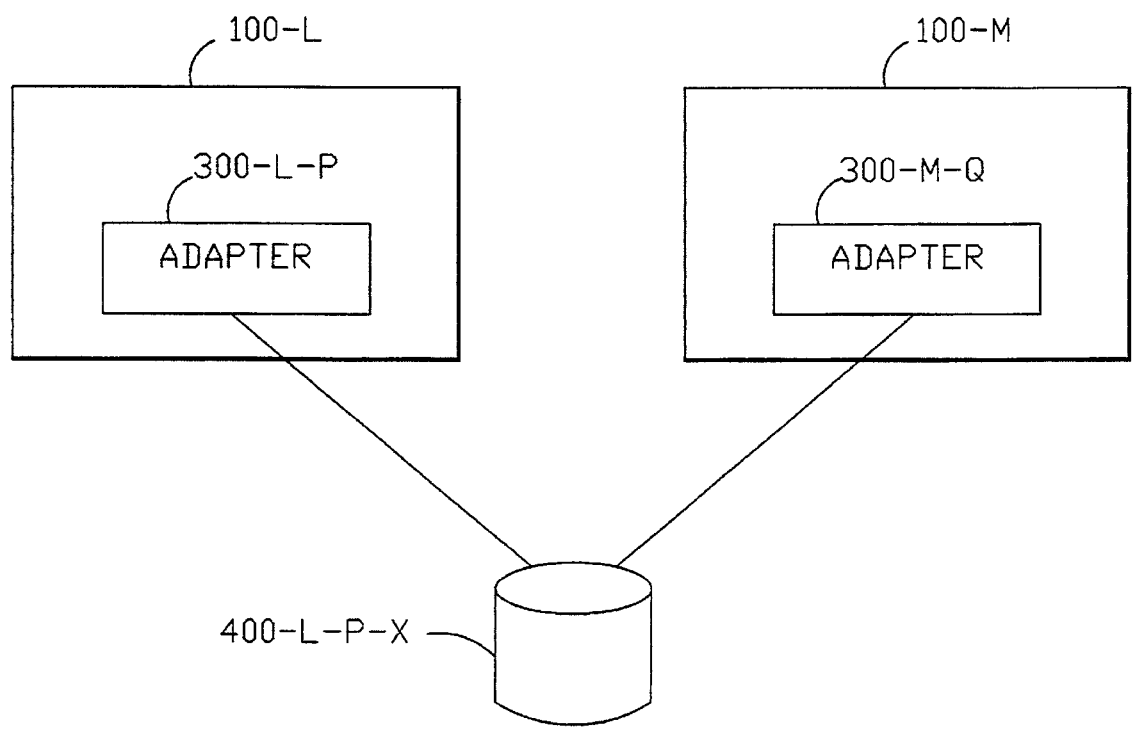
FIG. 2 illustrates a preferred organization of twin-tailed disks.

Disks which need to remain accessible in the event of a node or adapter failure, are attached to more than one adapter on different nodes. FIG. 2 illustrates the organization of a twin-tailed disk, where the disk 400-L-P-X is attached to adapter 300-L-P on node 100-L and adapter 300-M-Q on node 100-M.

During normal operation, for every disk, one of its tails is selected as the primary tail. Every node has a table (block 250-K-B in FIG. 7) that maps every virtual disk in the system to the node that holds the currently primary tail. The primary tail is the only tail used; the other tails of the disk are on stand-by.

Figure 3:
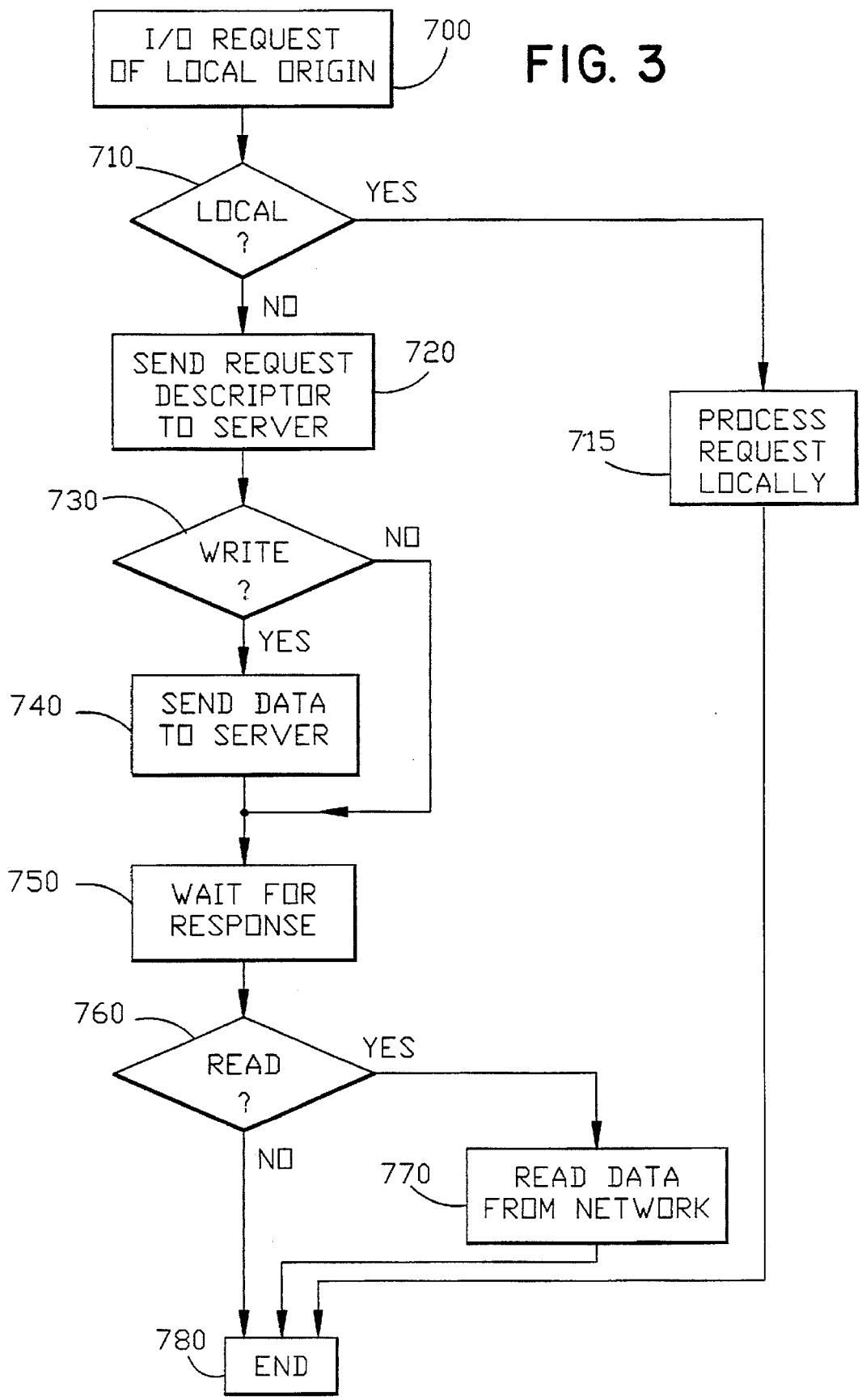
FIG. 3 is a flow chart which shows the steps involved in processing a request at a client node.

Applications running on any node can issue I/O requests for any disk, as if all disks were attached locally. The logic for handling a request at the node of origin is shown in FIG. 3. When the request is issued (block 700), the aforementioned map, 250-K-B, is checked to determine which node has the primary tail (block 710). If the node of origin is also the server node (i.e., holds the primary tail), the request is serviced locally (block 715). If the server node is different from the node of origin, a request descriptor is sent to the server node (block 720). If the request is a write request (determined in block 730), the data to be written is also sent to the server (block 740).

In block 750 the request (whether read or write) waits for a response from the remote server. When the response arrives, if the request was a read (determined in block 760), the data that came on the network is given to the original request (block 770). If the request was not a read, the request completes (block 780).

The request descriptor includes the same type of data that an operating system would conventionally send to a physical disk device driver (e.g. device name, offset, size of request, option flags, request type) as well as additional data such as the node of origin, a unique request identifier and the address of the primary node.

Figure 4:
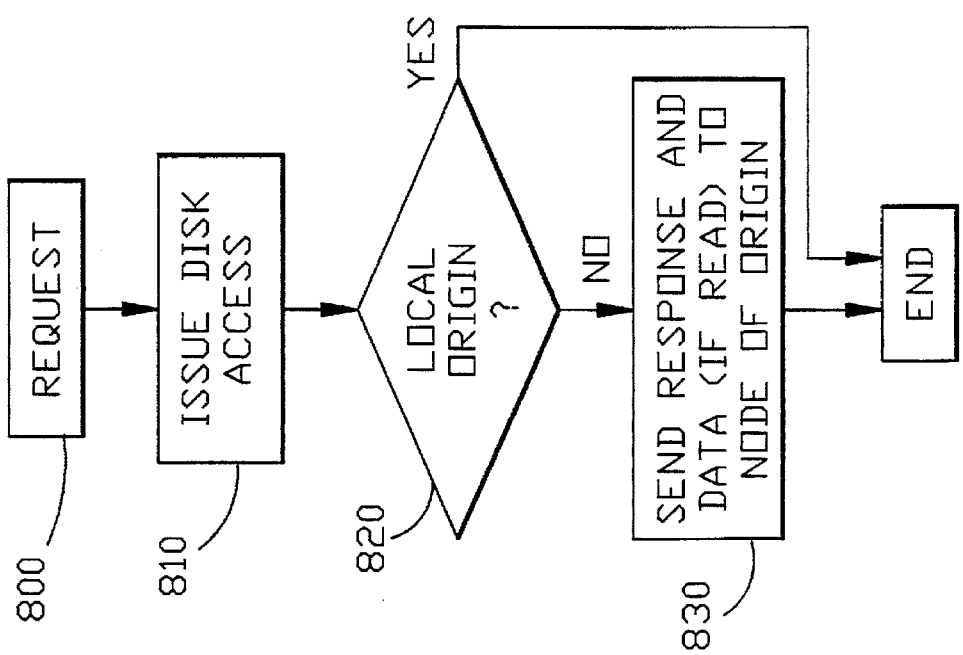
FIG. 4 is a flow chart which shows the steps involved in processing a request at a server node.

The logic for handling a request at the server node is shown in FIG. 4. A request (block 800) may have either been issued by a process running locally, or it may have arrived on the network from a remote node. In block 810, the access request is issued to the device. In block 820 the logic determines the source of the request. Upon I/O completion, if the request originated locally, the operation is complete and the originating process is notified. If the request originated at another node, in block 830 a response is sent back to the node of origin. If the request was a read, the data read is also sent. When the response arrives at the node of origin, the operation completes and the originating process is notified.

When a processor or adapter failure occurs, it is detected, in a conventional manner and all nodes are notified accordingly. Those skilled in the art will readily appreciate that various mechanisms (e.g., based on periodic health checks) can be used to detect failures.

In case of a node failure, the virtual shared disks affected are the ones for which the failed node was serving as the primary tail for the underlying physical device. In case of adapter failure, the virtual shared disks affected are the ones for which the primary tail of the underlying physical device was connected to the failed adapter. For all of the affected virtual shared disks, another tail of the underlying physical device is selected as the new primary tail. The selection can be made either statically (on the basis of a predetermined preference order) or dynamically (by a policy module that uses run-time information). The dynamic selection logic can be such that it attempts to achieve load balancing between the remaining active tails.

Figure 5:
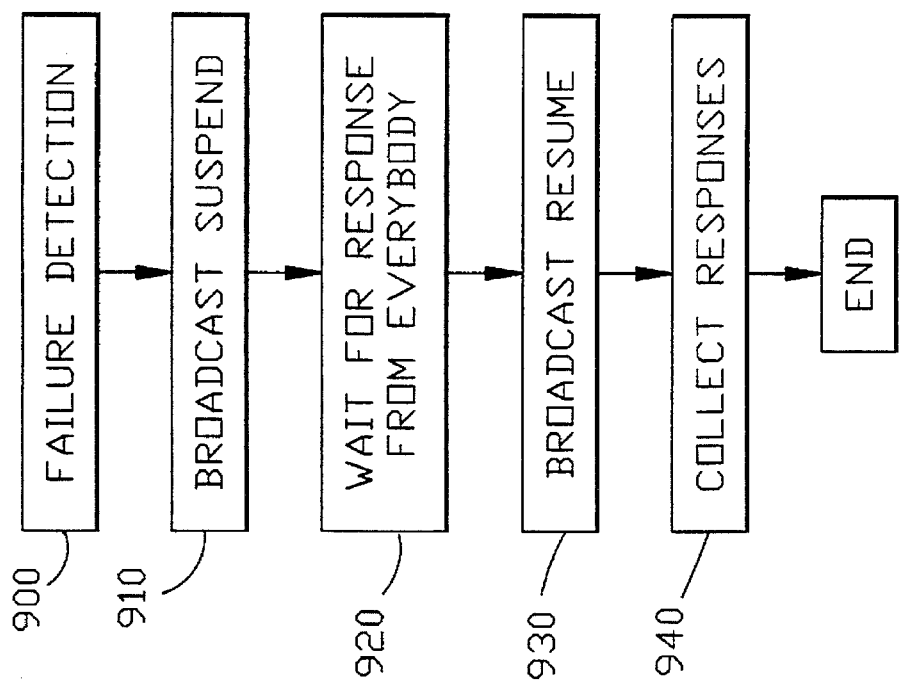
FIG. 5 is a flow chart which shows the steps involved in recovery at the coordinator node.
Figure 6:
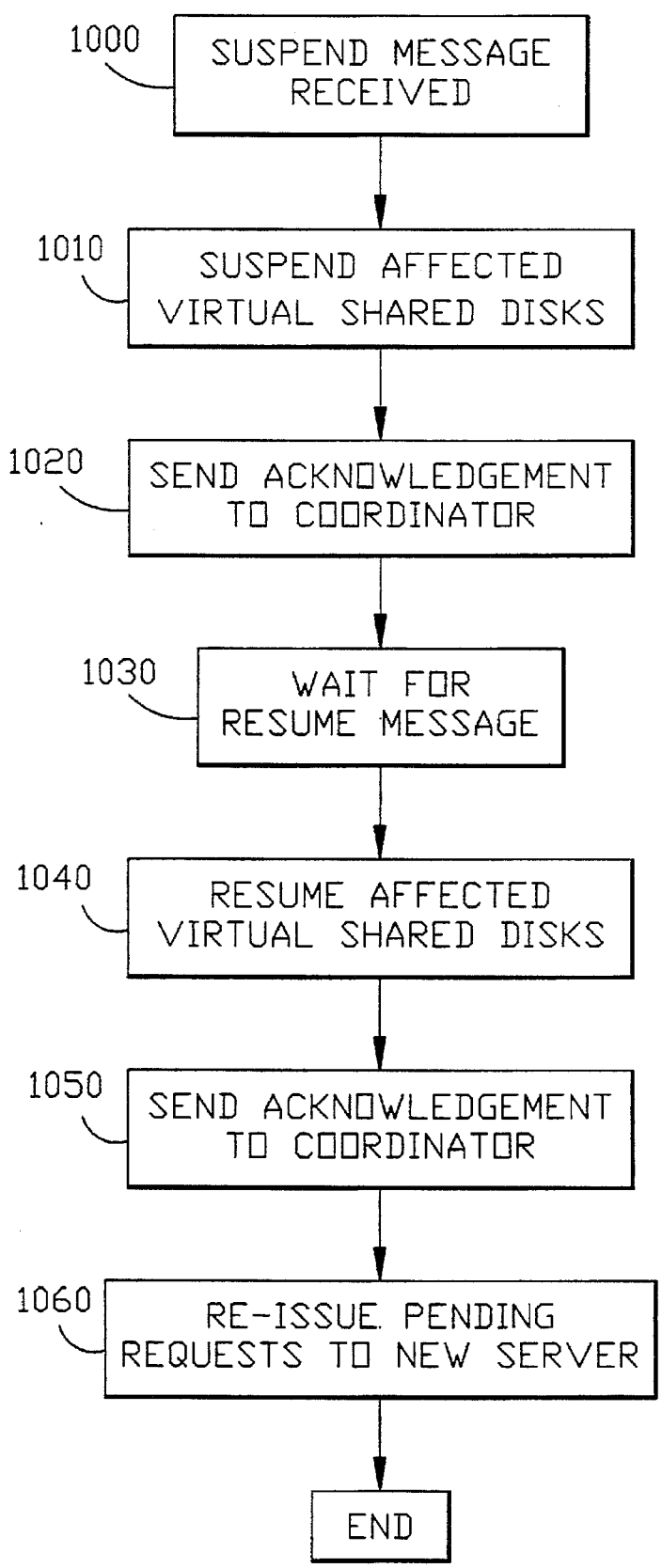
FIG. 6 is a flow chart which shows the steps involved in recovery at the participant nodes; and, FIG. 7 is a detailed block diagram of the memory resident logic and data related to the virtual shared disks.

One of the nodes in the cluster is designated as coordinator. The coordinator is responsible for notifying all nodes in the cluster about the failure. The logic executed by the coordinator is shown in FIG. 5. The logic for each participant node is shown in FIG. 6. The coordinator is also a participant.

Upon failure detection (block 900), the coordinator broadcasts a message to all participants (block 910), telling them to suspend the affected virtual shared disks. Upon receipt of this message (block 1000), each participant suspends the affected virtual shared disks (block 1010). Suspension of a virtual shared disk means that the virtual device is marked as temporarily having no primary tail. Pending requests that had been sent to the failed server are saved by the client of origin in a queue provided for this purpose. Requests that arrive while a virtual device is suspended are also saved by the client of origin in the same queue.

After suspension of the affected devices, each participant sends an acknowledgement to the coordinator (block 1020) and waits (takes no further action with respect to the affected VSD) until it receives a resume message from the coordinator (block 1030). Other processing is not affected. The coordinator waits for all participants to respond (block 920), and then broadcasts a message to all participants to resume the affected virtual shared disks (block 930). Upon receipt of this message, each participant resumes the affected virtual devices (block 1040). Resumption of a virtual device means that the node holding the selected new primary tail is recorded in the destination map for that virtual device. After resumption, the participant sends an acknowledgement to the coordinator (block 1050) and in block 1060 re-issues all pending requests (those pending prior to the suspension as well as those initiated during the suspension period) to the new server for the device. The coordinator collects the second-round acknowledgements from all nodes (block 940).

Agreement protocols other than the variant of two-phase commit we have described can be used to achieve the suspension and resumption of the virtual shared disks affected by the failure. Furthermore, in case of coordinator failure, another coordinator can be elected to perform the coordination of recovery.

A buffer with frequently or recently accessed data can be maintained in memory at the node that holds the primary tail for a disk. If the requested data is available in memory, the buffered memory copy is used; otherwise, a physical disk access must take place.

For twin-tailed or generally multi-tailed disks, any node physically attached to a disk can act as a server. Furthermore, any subset of the processors physically attached to the disk can act as servers simultaneously, i.e., there can be more than one primary tail active simultaneously. Nodes not attached to a particular disk can access that disk by shipping the request to any of its active servers. The choice of server can be made statically or dynamically.

It should be understood that the disk accesses being handled and rerouted in the event of failure are physical access commands rather than file system operations. In other words, in the present system, each node having a virtual shared disk issues commands (such as reads and writes to particular locations of the physical disk) to the disk device driver, as if the physical disk were directly connected to the node by way of a disk adapter. These commands are passed from the virtual shared disk software to disk driver software on a node directly connected to the primary tail (port) of the disk which, in turn, issues the command to the disk controller by way of the connected port.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

We claim:

1. A clustered multi-processing system comprising:
   at least three interconnected nodes wherein less than all nodes are server nodes, each node including a memory;
   a multi-ported disk having at least a primary tail physically attached to a primary server node and a secondary tail physically attached to a secondary server node;
   a disk access request mechanism, coupled to the nodes, for communicating a disk access request from an originating node to a server node physically attached to the disk along one of at least a primary disk access path and a secondary disk access path defined between the originating node, the server nodes and the disk;
   a failure detection mechanism, coupled to the nodes, for detecting failures along one of the primary disk access path and the secondary disk access path; and,
   proxy logic stored in the memory on each of the nodes and coupled to the failure detection mechanism, for redirecting subsequent disk access requests along a non-failing disk access path to the disk, when a failure is detected;
   said proxy logic comprising a two-phase commit protocol including:
      a coordinator node being adapted for broadcasting a suspend message to participant nodes to suspend access to a failed disk access path and waiting for an acknowledge message from all participant nodes;
      each participant node receiving the suspend message being adapted for suspending said access to the failed disk access path, sending the acknowledge message to the coordinator node confirming suspension of said access to the failed disk access path, and waiting for a resume message from the coordinator node;
      the coordinator node being further adapted for sending the resume message upon receipt of the acknowledge message from said all participant nodes; and
      said each participant node being further adapted for redirecting said subsequent disk access requests along the non-failing disk access path to the disk, upon receipt of the resume message.

2. The system of claim 1 comprising a queue, in each of the nodes, for storing incoming access requests to the disk; and, means for rerouting the requests in the queue to the disk by way of the non-failing disk access path.

3. The system of claim 1 wherein all server nodes include a disk adapter coupled to the disk and wherein the failure detection mechanism includes means for detecting failures in any of the server nodes and in the disk adapter.

4. A method for recovering from failures along a disk access path in a clustered computing system which includes at least three interconnected nodes wherein less than all nodes are server nodes and wherein each node includes a memory, and a multi-ported disk having at least a primary tail physically attached to a primary server node and a secondary tail physically attached to a secondary server node, comprising the steps of:
   detecting a failure in a disk access path in the clustered computing system, wherein a failed access path is associated with the primary tail;
   upon detection of the failure, a coordinator node broadcasting a message to all nodes of the system having access to the disk;
   each node receiving the message suspending access to the disk and acknowledging suspension of the access to the disk to the coordinator node;
   the coordinator node broadcasting a second message to the nodes to resume the access to the disk, responsive to said step of acknowledging suspension of the access to the disk; and
   each node receiving the second message, resuming the access to the disk by the secondary tail.

5. A method for recovering from failures along a disk access path as claimed in claim 4, comprising the steps of:
   in response to the message, saving pending requests that had been sent to the disk along the failed access path and saving requests that arrive while the access to the disk is suspended; and re-issuing all of the requests to the secondary server, responsive to said step of resuming the access to the disk at each node.

6. A method as claimed in claim 5 wherein said all requests are saved in a queue, wherein said step of re-issuing further comprises the step of rerouting the requests in the queue to the disk by way of the secondary server node.

7. A method for recovering from failures along a disk access path as claimed in claim 4 wherein all server nodes include a disk adapter and wherein the disk access path includes the disk adapter and the server nodes and wherein said step of detecting a failure comprises the step of detecting the failure in at least one of the nodes or the disk adapters.

8. A method for recovering from failures along a disk access path as claimed in claim 4, comprising the step of designating a backup coordinator node to perform the coordination of recovery if the coordinator node fails.

9. A clustered multi-processing system comprising:

at least three interconnected nodes wherein less than all nodes are server nodes, each node including a memory;

a multi-ported disk having at least a primary tail physically attached to a primary server node and a secondary tail physically attached to a secondary server node;

a disk access request mechanism, coupled to the nodes, for communicating a disk access request from an originating node to a server node physically attached to the disk along one of at least a primary disk access path and a secondary disk access path defined between the originating node, the server nodes and the disk;

a failure detection mechanism, coupled to the nodes, for detecting failures along one of the primary disk access path and the secondary disk access path; and, proxy logic means, coupled to the failure detection mechanism, for redirecting subsequent disk access requests via a two-phase commit protocol along a non-failing disk access path to the disk, when a failure is detected.

* * * * *